United States Patent [19]

Carter

[11] 3,975,816
[45] Aug. 24, 1976

[54] METHOD FOR MAKING FIBER REINFORCED RESIN TANK FORMING MANDREL

[75] Inventor: Frank A. Carter, Ferndale, Wash.

[73] Assignee: Ershig's, Inc., Bellingham, Wash.

[22] Filed: Dec. 10, 1974

[21] Appl. No.: 531,302

[52] U.S. Cl. .............................. 29/446; 156/173; 156/425; 242/72 R
[51] Int. Cl.² ........................................ B23P 11/02
[58] Field of Search ............ 156/189, 191, 172–173, 156/184, 425, 443; 29/446, 526; 52/758 F; 242/72 R

[56] References Cited
UNITED STATES PATENTS

| | | | |
|---|---|---|---|
| 1,731,817 | 10/1929 | Hudson | 242/72 UX |
| 2,754,993 | 7/1956 | Maker | 29/446 X |
| 2,799,307 | 7/1957 | Nickol | 156/443 X |
| 2,808,097 | 10/1957 | Martin | 156/425 X |
| 2,808,642 | 10/1957 | Fons et al. | 242/72 UX |
| 2,973,160 | 2/1961 | Zernov | 242/72 |
| 3,433,382 | 3/1969 | Boggio | 29/446 X |
| 3,524,780 | 8/1970 | Clements | 156/191 |
| 3,562,047 | 2/1971 | Carlini | 156/184 |
| 3,734,827 | 5/1973 | Schilling | 29/446 X |
| 3,815,840 | 6/1974 | Horton | 242/72 |
| 3,843,429 | 10/1974 | Jessup | 156/172 X |
| 3,887,976 | 6/1975 | Sheilds | 29/446 X |

*Primary Examiner*—Charlie T. Moon
*Attorney, Agent, or Firm*—Robert B. Hughes

[57] ABSTRACT

This method is particularly adapted for making tanks of different diameters. A plurality of arcuate forming sections are provided by forming a flexible sheet of a panel section against rigid arcuate forming segments having a degree of curvature corresponding to that of the inner surface of the tank to be formed. Turnbuckles are used to form the flexible sheets against the segments. These forming sections are then accurately located on a base circumference location and rigidly interconnected to make a rigid cylindrical forming structure, against which the fiber reinforced resin is layed up to make the tank structure. The panel sections each comprise a sheet having a pair of vertical edge bracing and connecting flanges by which the panel sections are joined, and a plurality of locating brackets which engage the forming segments to locate the forming sections with respect to one another.

8 Claims, 10 Drawing Figures

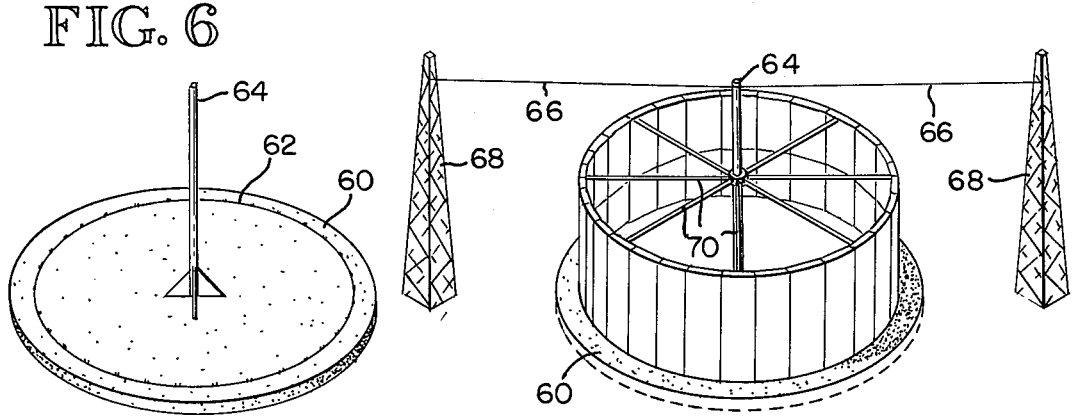
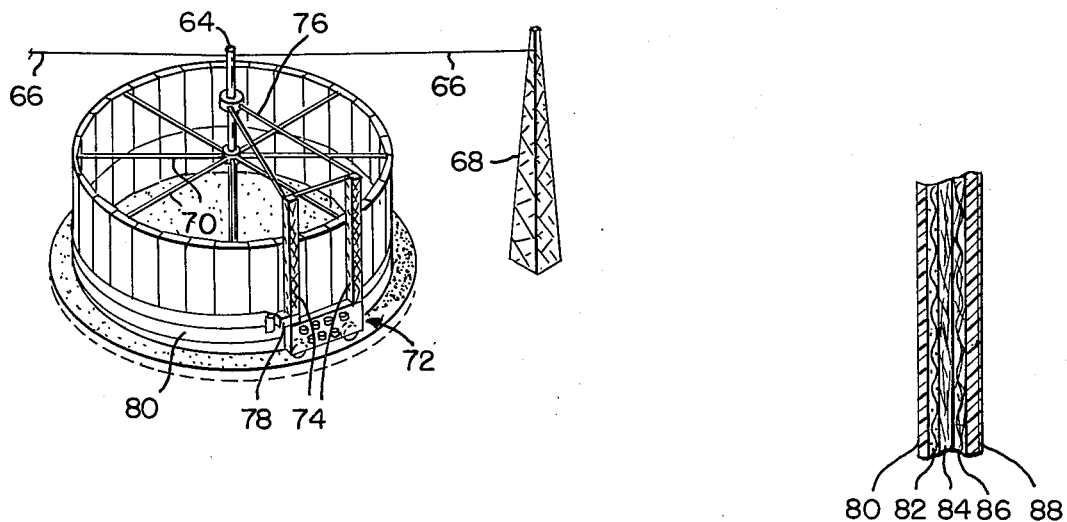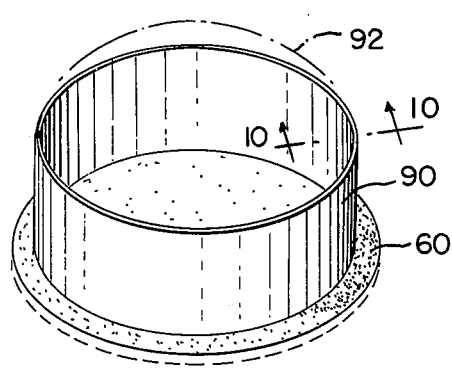

METHOD FOR MAKING FIBER REINFORCED RESIN TANK FORMING MANDREL

BACKGROUND OF THE INVENTION

1. Field of the Invention

The present invention relates to a method of making a fiber reinforced resin tank structure, and to apparatus especially adapted for use in said method, said method and apparatus being particularly adapted for forming tank structures of varying diameters.

2. Description of the Prior Art

One method of making a fiber reinforced resin tank is disclosed in U.S. Pat. No. 3,524,780, Clements, in which a "birdcage" type knockdown steel framework mandrel is constructed on a glass-resin tank bottom layer. This "birdcage" framework has a plurality of peripheral vertical columns which collectively define a circumference generally corresponding to the configuration of the inner surface of the tank to be formed. Then a plurality of sheets of plywood, fiber board, or the like are mounted to the columns of this framework. Thereafter, the entire framework is rotated, with a glass fiber-resin material being wound helically around the plywood sheets to form the tank structure.

U.S. Pat. No. 3,562,047, Carlini, discloses a method of making a fiber reinforced resin tank in which a mandrel is formed with a plurality of arcuate panels vertically aligned and arranged in a cylindrical configuration. The edges of the panels have inwardly extending flanges, by which the several panel sections are attached to the other. Two adjacent sets of such flanges are angled and make parallel to one another so that after the tank structure is wound on the mandrel, the panel section between such sets of flanges can be removed. This permits the remaining panels of the mandrel to be flexed moderately inwardly to permit the formed tank structure to be moved free of the mandrel and upwardly, so that a subsequent tank section can be made at a location below the upper tank section just formed. Presumably the panels of the mandrel have sufficient rigidity to provide a mandrel having sufficient structural strength to enable the material application to be accomplished without distortion of the mandrel.

U.S. Pat. No. 3,843,429, Jessup, shows yet another method of making a fiber reinforced resin tank structure, wherein there is attached to a plurality of vertical beams a number of arcuate liner panels that actually become part of the tank structure. Resin impregnated fibers are wrapped around these liner panels, with the final structure being a composite of these panels and the resin impregnated fibers.

U.S. Pat. No. 2,669,010, Perkins, shows a method of making cylindrical tank sections wherein a plurality of metal panels, having vertical edge flanges are secured one to another to form the cylindrical tank section. To adjust the curvature of the panels to the desired configuration, prior to joining the panels one to another, a plurality of arcuate stays are inserted in the panel sections. After the panels are joined together, the stays are removed, with the adjoining flange sections of the panels tending to pivot about the points of fastening to form tightly sealed joints of the finished tank structure.

Other patents relating generally to this art are: U.S. Pat. No. 2,579,183, Freyssinet; U.S. Pat. No. 3,700,512, Pearson et al; U.S. Pat. No. 3,783,060, Goldsworthy et al; U.S. Pat. No. 3,794,540, Griffith; and the U.S. Pat. No. 3,822,167, Piola.

One of the critical problems which exists in the prior art is to provide a method and apparatus which is readily adaptable to making tanks of different diameters. One method is simply to provide a number of cylindrical mandrels or forming structures of different diameters, with there being a sufficient number of these to make tanks of the sizes most commonly required. However, with the rather large diameter of tanks involved (e.g. 20 to 30 feet in diameter or greater), there is a fair capital investment involved in providing even one structure or mandrel of a size sufficient to form such a tank. If a single mandrel or forming structure is used, and it is to be made in such a manner that it can assume cylindrical configurations of different diameters, there is the problem of providing the mandrel or forming structure with sufficient rigidity and structural strength to provide adequate support during the forming process within the tolerances required (which tolerances usually permit the finished structure to be no more than 1% out of round). Finally, to be able to produce such tank structures at a competitive cost, there are important considerations with regard to ease of operation, reliability, durability of the components used, etc. These become especially critical where the tank or tank sections are being made at an "on site" location, rather than at a factory.

Accordingly, it is an object of the present invention to provide a method and apparatus for fabricating fiber reinforced resin tank structures, said method and apparatus being readily adapted for making tank structures of different diameters, and also being readily adapted for use in a factory or at an "on site" location.

SUMMARY OF THE INVENTION

In the method of the present invention, there is first provided a plurality of forming panels, each made up of a flexible forming sheet, and adapted for vertical erection. At each of the two vertical edges of each sheet, there is rigid locating means having a fixed angular relationship with its adjacent sheet edge. Each of the sheets has a predetermined lateral dimension, with the total of the width dimensions of the sheets equaling the circumference of the tank structure to be formed at the inner surface thereof. In the preferred form, the width dimension of each sheet is $\pi$ feet (3.1416 feet). Thus, by adding or subtracting one panel from the number of panels used, the diameter of the resulting tank can be increased or decreased in increments of one foot, so as to meet most size requirements.

Each sheet is formed into a substantially rigid arcuate forming section by means of rigid forming segments, each having an arcuate forming edge surface having a degree of curvature equal to that of the tank structure to be made, and a length substantially equal to the width dimension of its related sheet. In the preferred form, three or more forming segments are used for each sheet. The sheet is formed in the desired curved configuration against the segments by means of turnbuckles attached to rigid connecting brackets at the vertical edges of the sheets.

After the sheets are formed by means of the segments into rigid arcuate forming sections, these sections are located in an erected position proximate one another, along a base circumference location of a closed circle corresponding to the circular configuration of the inner surface of the tank to be formed. The arcuate forming sections are then secured one to another by means of the several connecting means to form a rigid forming cylinder having a continuous outer cylindrical surface corresponding within close tolerances to the inner surface of the tank to be formed. Thereafter, a fiber reinforced resin material is applied against the cylindrical surface to form the tank structure.

In the preferred form, the tank structure is formed by first applying a parting agent, such as a helically wound strip of a plastic material onto the cylindrical surface. Then a liquid coat of a thermo-setting resin is sprayed onto the a plastic material, after which a surfacing veil of a fiberglass material is applied and pressed on with a roller to form a mat. The resin with the mat impregnated therein is permitted to cure, and then a random application of short lengths of fiberglass impregnated with resin is accomplished in a spray type application. After this layer has cured, there is next a continuous winding of fiberglass strands circumferentially about the tank in a shallow helical pattern, with chopped glass interspersed therein, and with the fibers being impregnated with resin. Finally a pure resin seal coat is applied.

With respect to the apparatus of the present invention, the sheet of each panel is made of a moderately flexible material (e.g. aluminum sheet about 0.090 inch thick). A rigid stiffener is secured to each vertical edge of each sheet, each stiffener having a flange extending inwardly from the sheet surface at right angles thereto. At top, bottom and intermediate locations of each panel, there are locating brackets, also arranged at right angles to the plane of their related sheet. These brackets provide a seat for the arcuate forming segments which fit therein, provide a means for rigidly locating the forming sections one to another in the proper angular relationship so that a continuous outer cylindrical surface is formed, and also provide a means for mounting the turnbuckles by which the sheet of the forming section is made to conform to its associated forming segment.

Other particular features of the invention will become apparent from the following detailed description.

BRIEF DESCRIPTION OF THE DRAWINGS

FIGS. 6 through 9 are isometric views illustrating various steps of the process of the present invention; and FIG. 10 is a sectional view, drawn to an enlarged scale, taken along line 10—10 of FIG. 9.

DESCRIPTION OF THE PREFERRED EMBODIMENT

Figure 1:
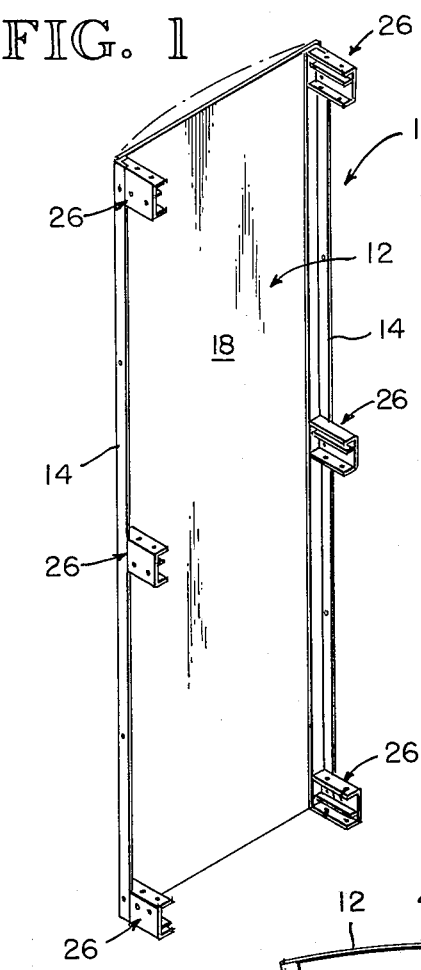
FIG. 1 is an isometric view of a forming section of the apparatus of the present invention.

In FIG. 1, there is shown a panel section 10 of the present invention. As will be described more fully hereinafter, each of these panel sections 10 is formed into a structurally rigid arcuate forming section, with the several sections then being interconnected to form a rigid cylindrical forming structure against which the tank structure is fabricated.

Each panel section 10 comprises a rectangular sheet 12 made of a moderately flexible metallic material, such as aluminum sheeting 0.09 inch thick. The length (vertical dimension) of the sheet is substantially the same as, or moderately greater than, the height of the tank structure to be formed thereby, and the width dimension of the sheet is $\pi$ times the increment by which it is desired to increase or decrease the diameter of the forming structure formed by a plurality of the panel sections 10 so as to form tank structures of different sizes. Since the diameter of a tank structure of a larger size is quite commonly in an even foot measurement, the width dimension of the sheet 12 is desirably $\pi$ feet (i.e. 3.1416 feet).

Figure 4:
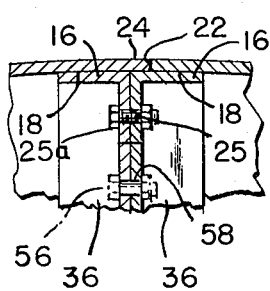
FIG. 4 is a sectional view, drawn to an enlarged scale, and taken along line 4—4 of FIG. 3.

Welded or otherwise fixedly secured to each vertical edge portion of the sheet 12 is a related one of two stiffeners 14. As shown herein, each stiffener 14 is a right angle metal section having a first flange 16 fitting against the inner surface 18 of the sheet 12 and attached securely thereto, and a second flange 20 extending inwardly from its related sheet 12 at a right angle to the adjacent portion of the sheet 12. The two stiffeners 14 are offset a short distance (e.g. one-quarter to one-half inch) in the same direction from vertical edges of the sheet 12. Thus, as can be seen in FIG. 4, at one edge of the sheet 12 there is a vertical right angle recess 22 formed by the stiffener 14 and edge of the sheet 12, and at the oppostie edge of the sheet 12, the edge of the sheet 12 extends beyond its related stiffener 14 as a laterally extending lip 24. Thus, as can be seen in FIG. 4, when the panel sections 10 are joined together, in a manner to be described hereinafter, there is an area of overlap or offset between the adjacent sheets 12 and their related stiffeners 14, which enhances proper matching of the sheets 12 to make a continuous cylindrical surface. The flanges 20 are provided with holes 25 by which the panels 10 can be connected by bolts 25a.

Each panel section 10 is provided with six locating brackets 26, positioned three along each vertical edge of the panel 10 at upper, lower and intermediate locations therealong. Each bracket 26 comprises a vertical web portion 28 extending from the inner face 18 of the sheet 12 at a right angle thereto. Extending laterally from the web 28 in a direction toward the vertical centerline of the sheet 12 are three horizontally disposed, vertically spaced flanges integral with the web 28. There are two upper flanges 30 and 32 which define therebetween a horizontal slot 34 which (as will be described hereinafter) is adapted to receive an edge portion of a related forming segment. At the lower edge of the web 28 is the third flange 36 having a pair of holes 38 by which one end of a turnbuckle (to be described hereinafter) can be secured to the multipurpose bracket 26.

The aforementioned forming segment is designated 40 and is made of a substantially rigid planar material such as a section of a piece of plywood. Each forming segment 40 has an outer forming edge surface portion 42 formed as a curve having a degree of curvature equal to the degree of curvature of the inner surface of the tank structure to be formed. (More specifically, the degree of curvature of the forming edge 42 is very slightly smaller than the degree of curvature of the inner surface of the tank structure to be formed, because of the thickness of the related sheet 12 interposed therebetween during the process of making the tank structure.) Each segment 40 also has two lateral edges 44, each of which is substantially straight and at right angles to the tangent of the adjoining portion of the curve of the edge 42. The fourth side of the forming segment 40 is conveniently formed as a straight edge joining the two lateral edges 44. Thus, in overall configuration, the forming segment 40 has the planar configuration of the outermost curved portion of a "pie" section, with the edge 42 being the curve of the "pie" and the two lateral edges 44 being the outermost portions of the radial lines of the "pie" section.

In the process of the present invention, each of the panel sections 12 is formed into a substantially rigid acrcuate forming section by means of a set of forming segments 40 (desirably three forming segments) and an equal number of turnbuckle assemblies 46 which functions to cause the sheet 12 of the panel section 10 to conform to the contour of the forming edges 42 of the segments 40. To accomplish this, each of the three segments 40 are placed between a pair of opposed brackets 26 so as to fit in opposed slots or channels 34 thereof. Thus, there is one forming segment 40 between the top two brackets 26, a second forming segment 40 at approximately the mid-height of the panel section 10 and a third segment 40 at the lower end of the panel section 10.

With the forming segments 40 in place, each of the three turnbuckle assemblies 46 are attached by end hooks 48 between a related pair of brackets 26. Desirably, each hook 48 is placed in the securing hole 38 in one of the flanges 30, 32 or 36. With the three turnbuckles 46 in place at upper, lower and intermediate locations, each turnbuckle 46 is rotated to tension the turnbuckle 46 and draw each related pair of brackets closer to each other. This causes the sheet 12 to bend about a vertical axis as it conforms to the curved forming edges 32 of the three segments 40. The tensioning of the turnbuckles 46 is continued until the sheet 12 fits snugly in a uniform curve against the three forming edges 42, and the side edges 44 of each segment 40 fit snugly in their related slots 34 of the brackets 26.

In this configuration, the panel 10, with the forming segments 40 and tensioning turnbuckles 46 forms a substantially rigid arcuate forming section, designated 50 in the accompanying drawing. The outer exposed surface 52 of the sheet 12 is curved uniformly about a vertical axis, with the curvature corresponding to the preselected curvature of the forming edges 42 of the segments 40. Also, the two locating brackets 26 have a fixed right angle relationship with respect to a line drawn tangent to the surface of the sheet 12 at the juncture of the bracket 26 with the sheet 12.

Figure 2:
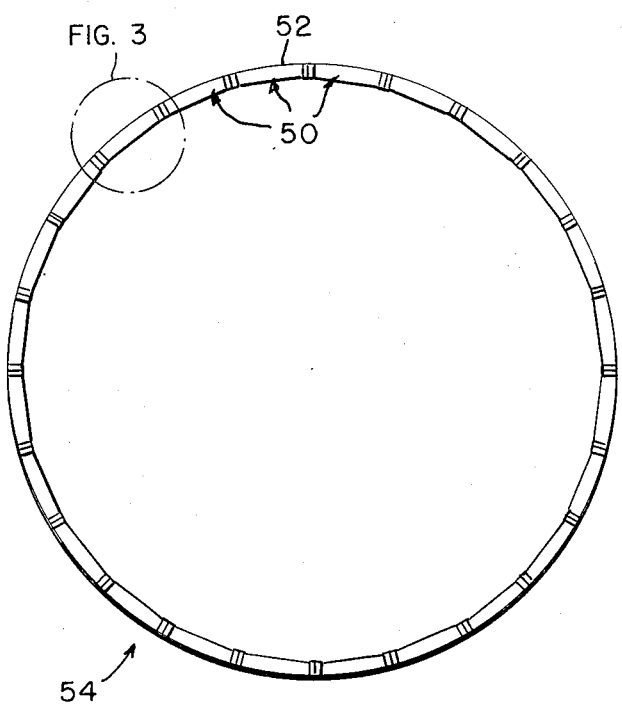
FIG. 2 is a top plan view illustrating a plurality of the forming sections of FIG. 1 assembled as a rigid forming cylinder about which the tank structure is formed.
Figure 5:
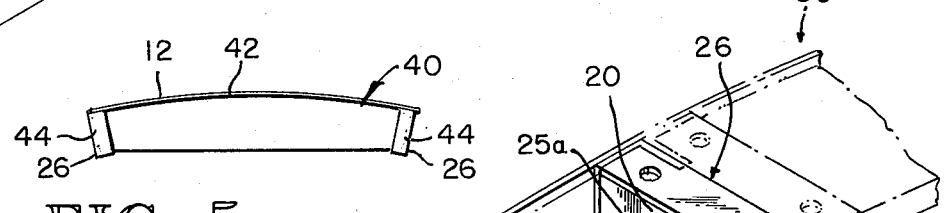
FIg. 5 is a plan view of one of the forming segments of the present invention.

After the appropriate number of forming sections 50 have been assembled, these sections 50 are erected vertically and accurately placed proximate one another along a base circumference line of a closed circle corresponding to the circular configuration of the inner surface of the tank structure to be formed. The configuration of these sections 50 so arranged is illustrated in FIG. 2 in a top plan view. It can be seen that the outer curved surfaces 52 of the forming sections 50 collectively define a vertically disposed cylindrical surface of a rigid cylindrical forming structure generally designed 54.

To describe more specifically the manner in which the forming sections 50 are joined, reference is again made to FIG. 3, where it can be seen that connecting bolts 25a extend between matching holes 25 in adjoining flanges 20 of stifferers 16 of two adjoining forming sections 50. With the brackets 26 being rigidly connected to their related sheets 12, and with the forming segments 40 and turnbuckles 46 acting in cooperation with the panel sections 10 to rigidize the components into the forming structure 50, the engagement between adjacent brackets 26 position adjoining forming sections 50 with respect to one another so that a true outer cylindrical surface is provided.

To describe the total operation by which the sections 50 are joined together to form the structure 54 and the tank structure actually made, reference is now made to FIGS. 6 through 9, wherein this is shown being accomplished at an "on site" or field location. In FIG. 6, it can be seen that a circular base 60 has been laid down. This base 60 can actually form the bottom portion of the tank structure being made, or it can be simply a temporary support base for the fabricating operation. On this base 60, there is scribed a circular locating line 62 corresponding to the inner circumference of the tank structure which is to be made. This line 62 can be made quite simply by scribing a line from a selected center point by means of a large compass-like device. Prior to erection of the forming sections 50, it is desirable to provide a center mast or post 64 on the base 60. As shown in FIG. 7, this center post 64 is stabilized from cables 66 attached to two or more towers 68 spaced from the base 60. Other means can be used for stabilizing the center post 64, such as extending the cables 66 from rigid radial arms from the post 64 to the ground. Such a structure can serve as a frame for a covering canvas during inclement weather.

Figure 3:
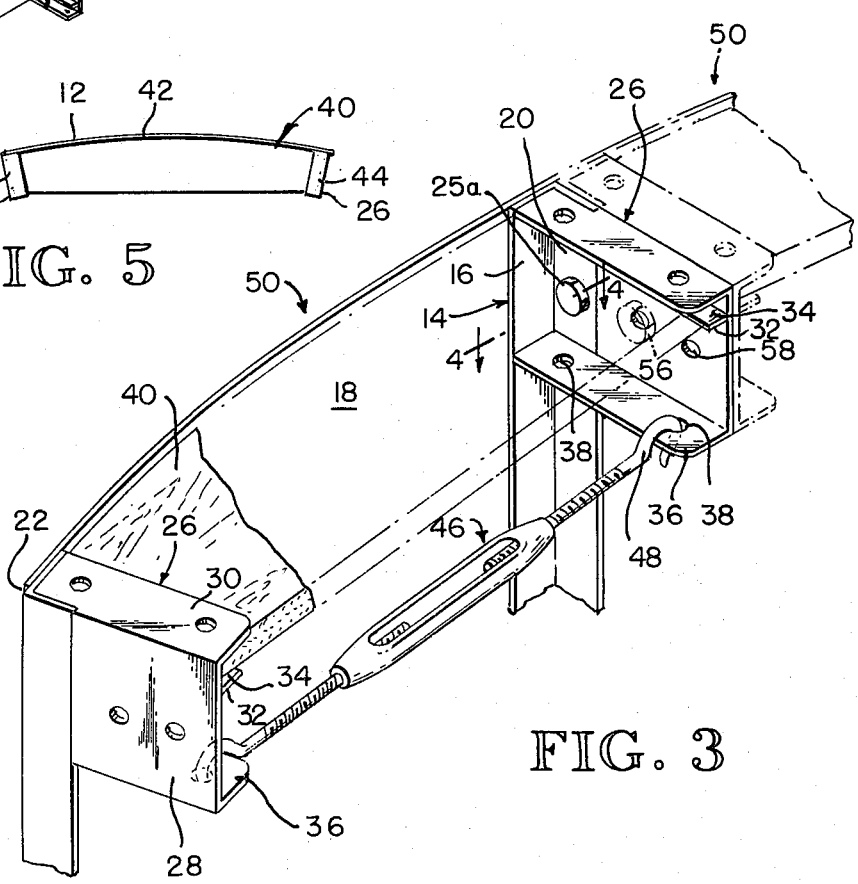
FIG. 3 is an isometric view, drawn to an enlarged scale, of that portion of the forming cylinder detailed at circle 3 of FIG. 2.

Next the several forming sections 50 are assembled as described previously herein. After assembly of the forming sections 50, each section 50 is positioned vertically, and then accurately located with the bottom edge of its outside curved surface 52 on the circumference line 62. As the sections 50 are so positioned, they are secured one to another in the manner previously described herein and as shown in FIG. 3. Additionally, bolts 56 can be inserted through aligned holes 58 in the brackets 26. After the sections 50 are so secured to one another, the resulting rigid cylindrical forming structure 54 provides an outer cylindrical surface corresponding quite closely to the base circumference line 62.

Subsequent to the formation of the cylindrical forming structure 54, additional bracing structure can, if desired, be provided interiorly of the structure 54. Such bracing structure is indicated somewhat schematically in FIG. 7 as struts 70 reaching outwardly from the center post 64.

With the forming structure 54 so erected, actual fabrication of the tank structure can then take place. A convenient means of applying the structural materials to the forming cylinder 54 is by means of a truck or trolley, indicated at 72 in FIG. 8, which travels continuously around the circumference of the structure 54. As shown in FIG. 8, the truck 72 has a pair of upstanding columns 74, the upper ends of which are attached by struts 76 to the center post 64, which thus acts as a guide for locating the truck 72 with respect to the structure 54. Since trucks, such as those shown at 72, are well known in the prior art, the main operational features of such a truck will be described only briefly herein. The material to be applied to the structure 54 is carried on the truck 72 and such application is made through a dispensing assembly 78 mounted to one of the towers 74. As the truck 72 moves at a constant speed around the structure 54, the dispensing assembly 78 moves up and down at a constant rate, so that the application of materials to the structure 54 is in a helical pattern.

The sequence of application materials will now be described with reference to FIG. 10, which shows the complete tank structure wall in cross-section. First, a parting agent is applied to the outer surface 52 of the structure 54, in the form of a plastic material film 80, which is unwound from a cylindrical roll and applied to the structure 54. (This particular application of that material is illustrated in FIG. 8.) Next a thin liquid coat of a thermo-setting resin is applied, after which a very thin surfacing view (e.g. 10 mils.) is applied onto the liquid resin. This surfacing veil is desirably a mat of random glass fibers. The surfacing veil is pressed into the resin coat by a roller and permitted to cure to form a second coat 82, which is the combination of the applied resin and surfacing veil.

After the resin-surfacing veil layer 82 has cured, there is next applied a coating of short lengths (e.g. 2 inches) of glass fibers impregnated with resin. There are in the prior art applicators which spray such fiberglass pieces (i.e. chopped fiberglass) and resin simultaneously onto a surface. The resulting layer 84 of chopped fiberglass and resin is rolled down and permitted to cure. The total thickness of this layer is in the order of one-tenth to one-eighth of an inch.

The next layer that is applied is a combination of resin impregnated fiberglass strands wound helically about the tank, with chopped strands of fiberglass being applied along with the application of the strands. The application of such continuous strands along with the chopped fiberglass is continued in ascending and decending helical patterns until adequate thickness is built-up to provide the structural strength needed for the tank structure being formed. Finally, after this layer designated 86 is permitted to cure, there is applied a pure resin coat which acts as a sealant, this coat being designated 88.

Upon completion of the fabrication of the tank structure, the forming structure 54 is at least partially disassembled so that it can be separated from the interior of the tank structure which has been formed, such tank structure being designated 90. As shown in FIG. 9, the tank structure 90 can function as the complete tank, in which case a cover would be applied thereto in a conventional manner, such a cover being indicated in dotted lines at 92. An alternative method of construction is to form a number of such tank structures 90, in the manner described above, and to place these structures 90 one on top of another and join these in a conventional manner.

When it is desired to form a tank structure of a different diameter, a different set of forming segments 40 are utilized, these segments having a degree of curvature of the forming edge 42 corresponding to that of the tank being formed. The same panels 10 and turnbuckles 46 can be used, but the number of panels 10 is increased or decreased to match the circumference of the tank to be formed. The panels 10, in their non-use condition, have a flat configuration and can easily be stacked and transported, or stowed at a location.

What is claimed is:

1. A method of making a mandrel for forming a fiber reinforced resin tank structure, said method being readily adapted for making tank structures of larger or smaller diameters, where the tank structure being made has a cylindrical configuration of a preselected diameter, circumference and degree of curvature, said method comprising:
    a. providing a plurality of substantially planar forming sheets, each of which is readily bendable into a curve about a vertical axis, each of said sheets having a predetermined lateral dimension, the total of which dimensions equals the circumference of the tank structure at the inner surface thereof;
    b. selecting a plurality of rigid forming segments for said forming sheets, each of which selected segments has an arcuate forming edge surface having a degree of curvature equal to that of the tank, and a length substantially equal to the width dimension of its related sheet,
    c. forming each of said sheets into a substantially rigid arcuate forming section by curving each of the sheets from its planar configuration to conform the sheet against the forming edge surfaces of at least two of said segments, and securing each of said sheets with respect to its related segments, with each sheet and its secured segments thus comprising a forming section having a degree of curvature closely corresponding to that of the tank structure being formed,
    d. accurately locating the forming sections, vertically erect and proximate one another, along a base circumference location of a closed circle corresponding to the circular connfiguration of the inner surface of the tank to be formed,
    e. providing at the vertical edge portions of each forming sections locating means having a predetermined rigidly fixed angular relationship with its related section, and
    f. rigidly interconnecting each of said forming sections to its two adjacent sections to form a substantially rigid forming cylinder having a continuous outer cylindrical surface corresponding within close tolerances to the inner surface of the tank to be formed, whereby fiber reinforced resin material can then be laid against said cylindrical surface to form said tank structure.

2. The method as recited in claim 1, wherein each of the sheets is formed against the forming segments by attaching tensioning means to vertical edge portions of the sheet and drawing the edge portions of the sheet together to cause the sheet to conform to the forming edge surface of the segments.

3. The method as recited in claim 2, wherein tensioning is applied to the lateral edges of said sheet by turnbuckle means secured between the lateral edges of the sheet.

4. The method as recited in claim 3, wherein said tensioning is applied at spaced vertical locations along said sheet, said locations being radially inward of the vertical edges of the sheet.

5. The method as recited in claim 1, further comprising providing forming segments with side edges at right angles to the adjacent portion of its arcuate forming edge surface, and fitting the side edges against substantially rigid locating members at the edge portions of said sheet, said method also comprising the further step of connecting the forming sections to one another by engaging adjacent locating members against one another to ensure proper angular relationship of the forming sections.

6. The method as recited in claim 5, further comprising forming each of said sheets against the forming segments by applying tension members between vertical edges of each sheet, so as to bring said locating members into proper engagement with the side edges of the forming segments, as well as bringing the sheet into conforming engagement with the arcuate forming edge surfaces of the segments.

7. The method as recited in claim 6, wherein the edges of said forming segments are located in substantially horizontal slots in said locating members.

8. The method as recited in claim 5, further comprising providing said sheet with vertical stiffeners at edge portions thereof, and offsetting each of said sheets with respect to its stiffeners, so as to form areas of overlap of the sheets and the stiffeners at the location where the forming sections are joined one to another, to enhance proper engagement of adjacent forming sections.

* * * * *